Jan. 27, 1953   R. Q. ARMINGTON ET AL   2,626,570
FLOATING GEAR PUMP
Filed June 13, 1947   2 SHEETS—SHEET 1
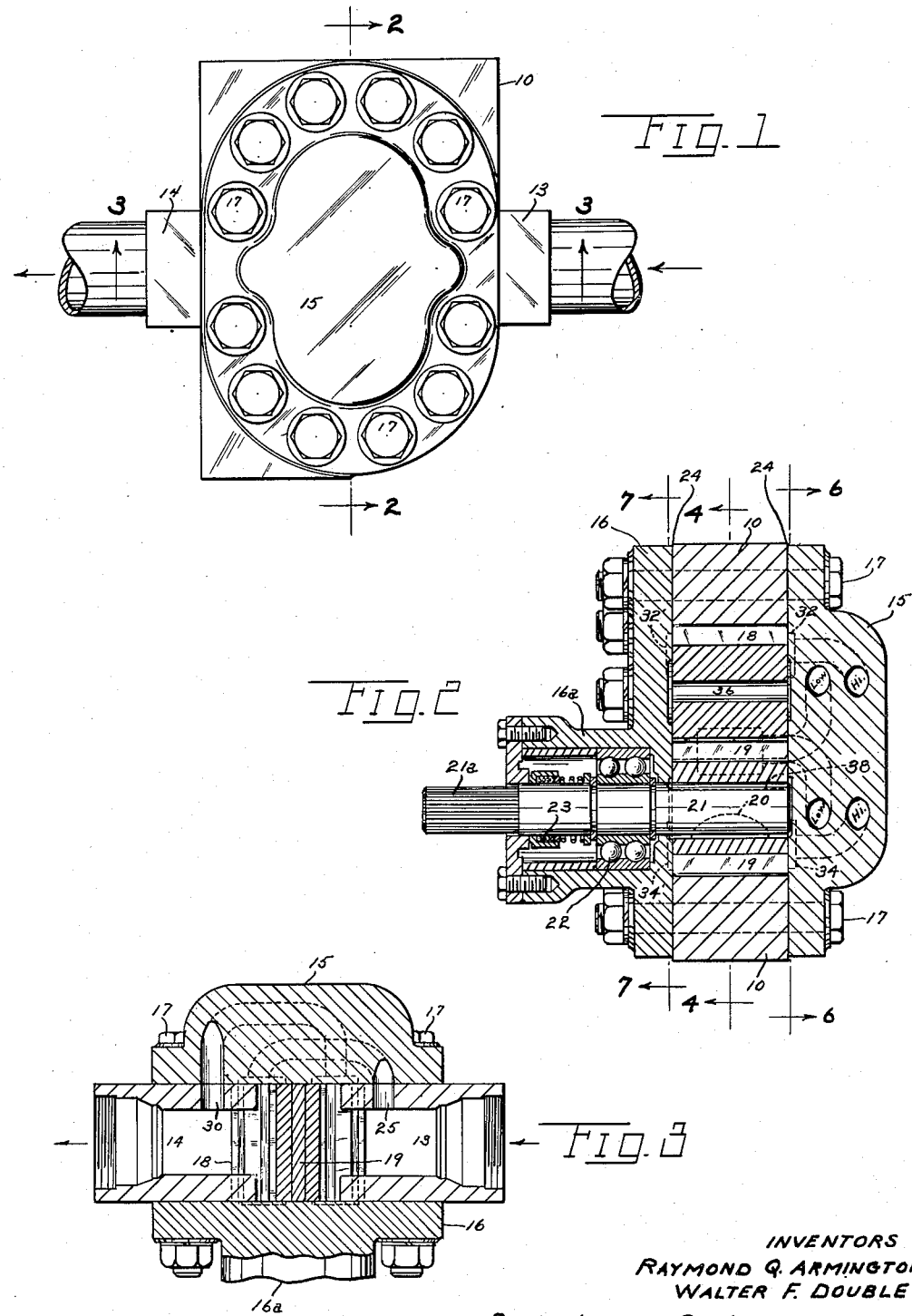
INVENTORS
RAYMOND Q. ARMINGTON
WALTER F. DOUBLE
By Hyde, Meyer, Baldwin & Doran
ATTORNEYS Jan. 27, 1953   R. Q. ARMINGTON ET AL   2,626,570
FLOATING GEAR PUMP Filed June 13, 1947   2 SHEETS—SHEET 2

INVENTORS
RAYMOND Q. ARMINGTON
WALTER F. DOUBLE
By Hyde, Meyer, Baldwin & Doran
ATTORNEYS

UNITED STATES PATENT OFFICE 2,626,570

FLOATING GEAR PUMP

Raymond Q. Armington, Shaker Heights, and Walter F. Double, Wickliffe, Ohio, assignors to The Euclid Road Machinery Co., Euclid, Ohio, a corporation of Ohio Application June 13, 1947, Serial No. 754,350

2 Claims. (Cl. 103—126)

This invention relates to improvements in a balanced gear pump and more particularly to one in which one of the gears floats freely without any connection whatsoever.

An object of the present invention is to provide a balanced gear pump which omits all bearings except the one that is necessary to support the coupling end of the drive shaft.

Another object of the present invention is to so equalize the pressures exerted in any and all directions on the gears so that they are substantially equally balanced.

Still another object of the present invention is to provide the maximum bearing surface possible for the periphery of the gear teeth in their surrounding housing.

Still another object of our invention is to balance the end thrust on the gears in a novel manner and to reduce the sliding contact on the faces of the gears.

Other objects and advantages reside in the arrangement of the parts for carrying out the above-mentioned purposes as will be more clearly understood from the description and the drawings and the essential features will be summarized in the claims.

In the drawings:

Fig. 1 is a side elevational view of a pump embodying our invention;

Fig. 2 is a sectional view taken along the line 2—2 of Fig. 1;

Fig. 3 is a sectional view taken along the line 3—3 of Fig. 1;

Figs. 4, 6 and 7 are sectional views taken along similarly numbered lines of Fig. 2; while

Figure 4:
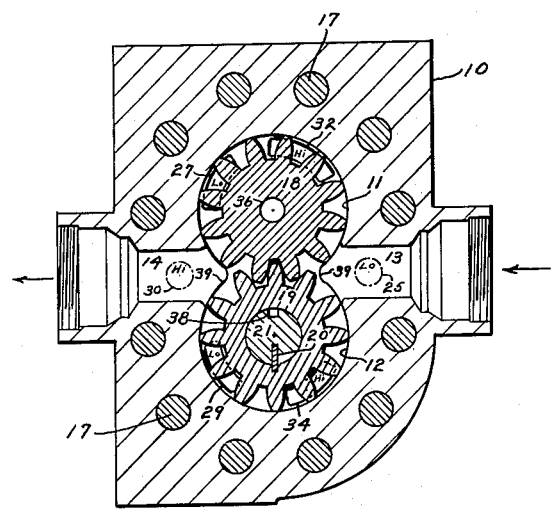

In designing a hydraulic pump or motor, in order to get efficiency it is necessary to maintain a very small clearance between the outside diameter of the gears and the inside diameter of the housings. This clearance must be of the order of one-thousandth of an inch. In conventional pumps the gears are mounted on shafts which, in turn, are supported by bearings. It is assumed that these bearings hold the gears in position so that they do not rub in the housing. However, when attempting to build a highly efficient gear pump and reducing the clearance between the gear and the housing to one-thousandth of an inch, it is found in practice that deflections in the bearings, shafts, and other parts occur together with accumulations of slight errors in manufacture, which allow the gears to rub on the housing. The present invention does away with all but one of the bearings and relies upon exact balancing of the gears to hold the gears with very slight frictional resistance against the housings, even though the clearances are maintained at the desirable minimum.

Our invention will be described as a pump although attention will be called later to the fact that the same structure may be utilized as a hydraulic motor.

The pump housing is shown as comprising a main body 10 through which extend two bores 11 and 12 arranged so that the two circles intersect on the center line of the inlet passageway 13 and the outlet pasageway 14. One end of the housing is closed by a plain cover 15 while the other end of the housing is closed by a bearing cover 16. These covers are bolted to the main body by bolts 17 in the usual manner. In the bore 11 is a driven gear 18 while in the bore 12 is a driving gear 19. The latter is secured by a key 20 to a shaft 21 the end of which extends outside of the housing and is adapted to receive a driving connection at 21a. A sleeve 16a extends outwardly from the cover 16 and holds a single bearing 22 for shaft 21 and a conventional sealing means 23 to prevent leakage of fluid out of the pump along the shaft 21. The gears 18 and 19 along the plane indicated at 24 in Fig. 2 have very slight clearance with the cover plates 15 and 16, say, of the order of one-thousandth of an inch. Similarly, the peripheries of the gear teeth have a clearance with the circumferential walls of the bores 11 and 12 as viewed in Fig. 4 of the order of one-thousandth of an inch.

Means is provided for balancing the radial thrust on each of the gears. As clearly shown in Figs. 2, 3 and 6, a passageway 25 leading from the inlet passageway 13 is connected by passageway 26 in the cover 15 with a recess 27 which is along side the teeth of the gear 18. Another passageway 28 in the cover plate 15 connects passageway 25 with a recess 29 which is along side the teeth of gear 19. Referring to Fig. 4 it will be seen that the pressure exerted radially on the gears 18 and 19 adjacent the inlet passageway 13 is transferred to diametrically opposite ports 27 and 29 and there exerted in the opposite direction on the gears 18 and 19 so that these pressures almost exactly balance each other. In a similar manner a passageway 30 leads out of the discharge passageway 14 and is connected by a passageway 31 in the cover 15 with a port 32 which is along side the teeth of gear 18. Another passageway 33 connects passageway 30 with ports 34 which is along side the teeth of gear 19. Referring again to Fig. 4 it will be seen that the pressure exerted from the discharge passageway 14 radially inwardly against the gears 18 and 19 is almost exactly balanced by a similar pressure at ports 32 and 34 which are diametrically opposite on the respective gears.

Figure 7:
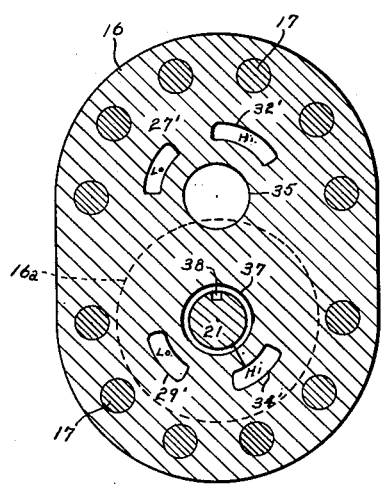

Means is provided for balancing the end pressure against the teeth of a given gear. Referring to Figs. 2 and 7, it will be seen that in the cover 16 there are provided ports or recesses 27', 29', 32' and 34' exactly opposite and of the same dimensions as the respective ports 27, 29, 32 and 34 already described. It results from this construction that the pressure in the ports 27, 29, 32 and 34 is transmitted through the openings between teeth to the respective ports opposed thus balancing the pressure on opposite ends of the gear teeth.

Figure 6:
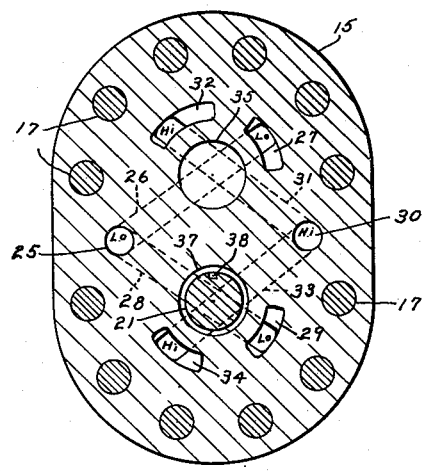

Other means is provided for balancing the end thrust on the gears 18 and 19. Referring to Figs. 2, 6 and 7, it will be noted that circular pockets 35 of equal size and concentric with gear 18 are provided in covers 15 and 16 at the opposite faces of gear 18. An opening 36 extending entirely through gear 18 connnects these two pockets so as to equalize the pressure on the opposite end faces of the gear. In a similar manner, pockets 37 of equal diameter are formed in covers 15 and 16 on opposite sides of gear 19 and concentric with the gear. A passageway 38 connects these pockets so as to equalize the pressure on opposite end faces of this gear. It should be noted that the pockets or recesses 35 and 37 reduce the area of sliding contact on the faces of the gears.

It was mentioned above that radial thrust on each of the gears is substantially balanced. However, there is a slight unbalance which is in the direction of forcing the gears outwardly or away from the passages 13 and 14. Thus the gears actually tend to bear slightly against the outer walls of the bores 11 and 12. This is desirable because the bores of the housing naturally have to be interrupted at the center of the pump where the gears mesh, while it is continuous on the outer sides of the gears. In this way a satisfactory bearing is provided to take care of the small resultant loads on the gears. Actually this load is never more than a few hundred pounds and this is divided between a large number of teeth as will be readily seen in the drawings.

At the zones marked 39 where the bores 11 and 12 intersect, it will be noted that the pump body is carried around the gears as far as possible. This is to provide the maximum bearing area for the gears. This is especially necessary for the gear that is mounted on the drive shaft, as loads may occur due to the driving coupling on this drive shaft. By providing this extra bearing area in the housing, the possibility of the gears jumping around inside the housing is eliminated.

Figure 5:
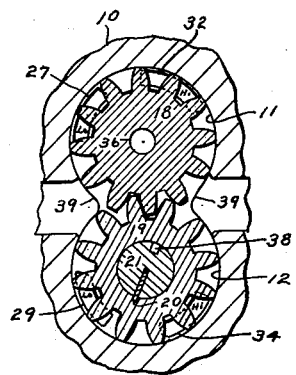
Fig. 5 is a fragmental sectional view similar to Fig. 4 and showing another position of the gears.

It will be noted in Figs. 4 and 5 that there is usually only one tooth on each gear which acts as a seal at any one point in the high or low pressure zones. This gives entirely satisfactory performance due to the small clearances with which the pump is designed.

It should be noted that bearings on the idler gear 18 or any shaft for supporting the same are omitted entirely. This gear floats completely within the bore 11 and between the covers 15 and 16. One bearing only is required on the entire pump and that is on the coupling end of the drive shaft 21.

While we have described our invention as a pump, it will be obvious to those skilled in this art that by reversing the arrows indicating direction of flow the device may be converted to a hydraulic motor. In other words, fluid under pressure would enter at the passageway 14 and would be discharged at the passageway 13, causing a rotation of the gears 18 and 19 in its movement through the pump housing. The power thus generated would be taken off shaft 21 by a coupling at the end 21a.

What we claim is:

1. A device for use with hydraulic fluid comprising in combination two gears coacting at an intermeshing zone between them, a housing closely surrounding said gears except at said zone, fluid inlet and outlet passageways at said zone permitting fluid flow tangentially of said gears, ports in said housing adjacent the teeth of each of said gears and diametrically opposite the teeth of said gears exposed to pressure from said inlet and outlet passageways, said ports in each instance including chambers wholly adjacent opposite end faces of the teeth and within the periphery of the gear, said chambers on opposite ends of the teeth at a given point being substantially equal in tooth area covered, said ports covering approximately the same number of teeth as the respective diametrically opposite teeth exposed to pressure from said passageways, passage means for conducting pressure from said inlet and outlet passageways respectively to said ports diametrically opposite, a shaft rigidly secured to one of said gears axially thereof and extending outside of said housing and there provided with a drive connection, and the other of said gears being free of any connection and floating in said housing, there being an opening provided extending axially through said floating gear, and recesses in said housing adjacent opposite end faces of said floating gear communicating with said opening and concentric about the axis of said floating gear and of substantially greater diameter than said opening, whereby to equalize the pressure on opposite end faces of the said floating gear and to minimize the friction between the end faces of said gear and said housing.

2. A device for use with hydraulic fluid comprising in combination two gears coacting at an intermeshing zone between them, a housing closely surrounding said gears except at said zone, fluid inlet and outlet passageways at said zone permitting fluid flow tangentially of said gears, means balancing fluid pressure against opposite end faces of the teeth of each of said gears, a shaft rigidly secured to one of said gears axially thereof and extending outside of said housing and there provided with a drive connection, there being an opening provided extending axially through at least one of said gears, and recesses in said housing adjacent opposite end faces of said last named gear communicating with said opening and concentric about said axis of said last named gear, said recesses having a diameter at least twice the diameter of said opening, whereby to equalize the pressure on opposite end faces of the said last named gear and to minimize the friction between the end faces of said gear and said housing.

RAYMOND Q. ARMINGTON.
WALTER F. DOUBLE.

REFERENCES CITED

The following references are of record in the file of this patent:

UNITED STATES PATENTS

| Number | Name | Date |
|---|---|---|
| 917,466 | Lees | Apr. 6, 1909 |
| 984,811 | Hanson et al. | Feb. 21, 1911 |
| 1,691,713 | Frey | Nov. 13, 1928 |
| 1,795,579 | Storey | Mar. 10, 1931 |
| 1,879,219 | Harbison | Sept. 27, 1932 |
| 1,897,560 | Lawser | Feb. 14, 1933 |
| 1,937,367 | Vickers | Nov. 28, 1933 |
| 2,103,524 | Ernst | Dec. 28, 1937 |
| 2,207,493 | Van Dartelen | July 9, 1940 |
| 2,212,994 | Vrolix | Aug. 27, 1940 |
| 2,263,548 | Mueller et al. | Nov. 18, 1941 |
| 2,319,374 | Ungar | May 18, 1943 |
| 2,338,065 | Ungar | Dec. 28, 1943 |
| 2,349,022 | Ungar et al. | May 16, 1944 |
| 2,391,072 | Pugh | Dec. 18, 1945 |
| 2,395,824 | Herman | Mar. 5, 1946 |
| 2,420,622 | Roth et al. | May 13, 1947 |

FOREIGN PATENTS

| Number | Country | Date |
|---|---|---|
| 263,590 | Great Britain | Jan. 6, 1927 |
| 265,576 | Great Britain | Aug. 4, 1926 |

OTHER REFERENCES

Ser. No. 309,103, Vanni (A. P. C.), published May 11, 1943.